Figure 1:
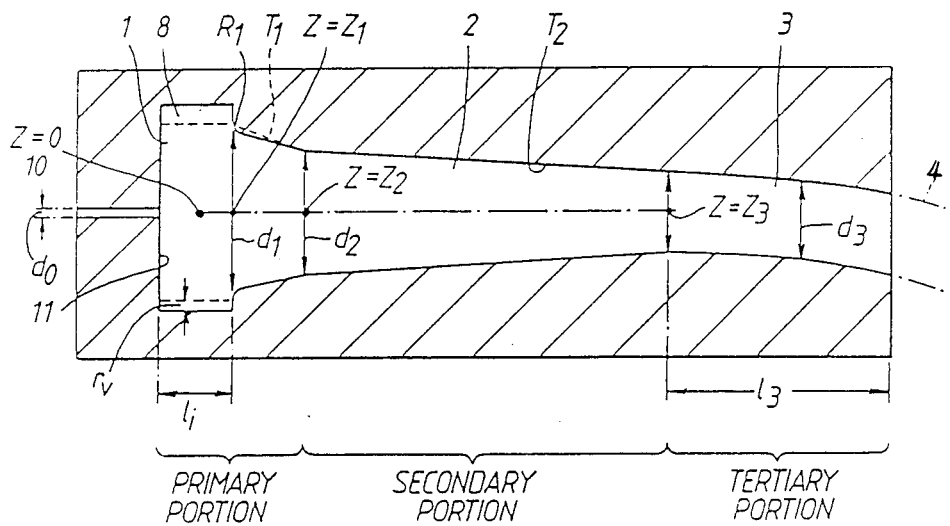

United States Patent [19]

Colman et al.

[11] Patent Number: 4,764,287
[45] Date of Patent: Aug. 16, 1988

[54] CYCLONE SEPARATOR

[75] Inventors: Derek A. Colman, Fleet; Martin T. Thew, South Hampton, both of United Kingdom

[73] Assignee: B.W.N. Vortoil Rights Co. Pty. Ltd., Victoria, Australia

[21] Appl. No.: 852,964

[22] PCT Filed: Aug. 2, 1985

[86] PCT No.: PCT/AU85/00181
§ 371 Date: May 14, 1986
§ 102(e) Date: May 14, 1986

[87] PCT Pub. No.: WO86/01130
PCT Pub. Date: Feb. 27, 1986

[30] Foreign Application Priority Data

Aug. 2, 1984 [GB] United Kingdom ............... 8419771

[51] Int. Cl.$^4$ .............................................. B01D 17/038
[52] U.S. Cl. .................................... 210/788; 209/144; 209/211; 210/512.1
[58] Field of Search ................... 210/512.1, 287, 788; 209/144, 211

[56] References Cited

U.S. PATENT DOCUMENTS

| | | | |
|---|---|---|---|
| 2,377,524 | 6/1945 | Samson et al. | 210/512.1 |
| 2,735,547 | 2/1956 | Vissac | 210/512.1 |
| 4,576,724 | 3/1986 | Colman et al. | 210/512.1 |

Primary Examiner—Frank Sever
Attorney, Agent, or Firm—Ladas & Parry

[57] ABSTRACT

This invention relates generally to cyclone separators. The separator of the present invention may find application in removing a lighter phase from a large volume of a denser phase, such as oil from water, with minimum contamination of the more voluminous phase. Generally, cyclone separators are designed for the opposite purpose, that is, removing a denser phase from a large volume of a lighter phase, with minimum contamination of the less voluminous phase. In one form of the present invention, a typical starting liquid-liquid dispersion would contain under 1% by volume of the lighter (less dense) phase, but it could be more.

21 Claims, 1 Drawing Sheet

CYCLONE SEPARATOR

According to one aspect of the present invention there is provided a cyclone separator comprising at least a primary portion having generally the form of a volume of revolution having a first end and a second end the diameter at said second end being less than the diameter at said first end, a single inlet with at least a tangential component at or adjacent said first end for introducing feed to be separated into the cyclone separator and the separator further including at least two outlets.

In one form of the cyclone separator of the invention the following relationship applies: wherein $d_i$ is the diameter of the primary portion at the inlet, $d_2$ is the diameter of the second end of the said primary portion, $d_i$ is greater than $d_2$ and is twice the radius from the cyclone separator axis to the mean point when flow enters the cyclone separator and is greater than $d_i$, and $A_i$ is the area of the inlet where flow enters the cyclone separator measured in the plane including the cyclone axis and the said mean point of flow entry then:

$$\frac{\pi d_2 d_i}{4A_i}$$

is from 3 to 12 and preferably from 4 to 10 and more preferably from 6 to 8. The above term will be termed the "swirl coefficient" and is discussed in more detail later.

The cyclone separator may further include a generally axially symmetrical secondary portion at the aforementioned second end of and substantially coaxial with the primary portion. In another form the separator may further include a tertiary portion at the end of and substantially coaxial with said secondary portion remote from the primary portion. It will be appreciated that the separator could also include additional portions to that described above.

In one particular form of the invention wherein $d_2$ which is the diameter of the primary portion at the aforementioned second end measured at a point $z_2$ where the condition first applies that:

$$\tan^{-1}\left(\frac{d_2 - d}{2(z - z_2)}\right) < 2°$$

for all $z > z_2$ where z is the distance along the cyclone separator axis downstream of the inlet.

Preferably the inlet gives into an inward spiralling feed channel which may be involute in form. In one form the feed channel subtends at least 360° at the cyclone axis. The feed channel may also converge by substantially equal radial decrements per unit angle around the axis. The inlet may enter the cyclone with a component in the axial downstream direction.

In another form of the invention, the cyclone separator is defined as follows. The cyclone separator has a primary portion having generally the form of a volume of revolution with a single inlet (preferably tangential, and preferably with an inwards spiralling feed channel such as an involute entry) for introducing feed to be separated into the cyclone separator and, adjacent to the primary portion and substantially coaxial therewith, a generally axially symmetrical secondary portion converging (preferably uninterruptedly) into a tertiary portion. The primary portion may have an axial overflow outlet opposite the secondary portion (i.e. in its end wall). In the cyclone separator, the following relationships (i)-(v) apply: where $d_1$ is the diameter of the cyclone in the primary portion where flow enters (but neglecting any feed channel), $d_i$ is twice the radius at which flow enters the cyclone (i.e. twice the minimum distance of the tangential component of inlet centreline from the axis), $A_i$ is the cross-sectional area of the inlet at entry to the cyclone in a plane parallel to the axis of the cyclone and perpendicular to the component of the inlet centreline not parallel to the cyclone axis, $d_2$ is the diameter of the cyclone where the primary portion joins the secondary portion the point of junction being defined as being at the axial positions $z_2$ (measured away from the inlet plane) where the condition first applies that:

$$\tan^{-1}\left(\frac{d_2 - d}{2(z - z_2)}\right) < 2°$$

for all $z > z_2$ where
d is the cyclone diameter at z,
$d_3$ is the cyclone diameter where the secondary portion joins the tertiary section and is defined as the diameter at $z_3$ where $d/d_3 > 0.98$ for all $z > z_3$, $d_o$ is the minimum internal diameter of the axial overflow outlet, then:

$$3 < \frac{\pi d_2 d_i}{4A_i} < 12 \quad \text{(i)}$$

$$20' < \alpha < 2° \quad \text{(ii)}$$

where $\alpha$ is the half angle of convergence of the secondary portion i.e.

$$\alpha = \tan^{-1}\left(\frac{d_2 - d_3}{2(z_3 - z_2)}\right)$$

$$d_o/d_2 < 0.2 \quad \text{(iii)}$$

$$0.9\, d_1 > d_2 \quad \text{(iv)}$$

$$0.9\, d_2 > d_3 \quad \text{(v)}$$

The feed channel may be fed from a duct directed substantially tangentially into the primary portion, the (outer) wall of the channel converging to the principal diameter of the primary portion $d_1$, for example by sustantially equal radial decrements per unit angle around the axis, preferably attaining the diameter $d_1$ after 360° around the axis.

The feed channel need not be in a plane normal to the axis, and if offset, so as to adopt a generally helical form, may attain the diameter $d_1$ after more than 360° (e.g. 720°) around the axis. Using a single inlet, only a single feed connection has to be made to the cyclone separator, which is simpler to install and saves space, important advantages on board a ship or oil-rig; this arrangement also makes for manufacturing simplicity. The expression $$\frac{\pi d_2 d_i}{4A_i},$$

which as mentioned above is termed the 'swirl coefficient' S, is a reasonable predictor of the ratio of velocities tangentially:axially of flow which has entered the cyclone and which has reached the plane of $d_2$ and, (with a dispersed lighter phase, as is of particular interest in order to be able to create an internal flow structure favourable for separation at a low split ratio* of the order of 1% then the half-angle of convergence averaged over the whole secondary portion is 20' to 2°, preferably less than 1°, more preferably less than 52', preferably at least 30'. S is from 3 to 12, preferably from 4 to 10, more preferably from 6 to 8. The convergence averaged from the diameter $d_1$ measured in the inlet plane to the diameter $d_2$ may be the fastest (largest cone half-angle) in the cyclone, and may be from 5° to 45°. (The inlet plane is that plane normal to the cyclone axis including the centroid of the area $A_i$). The primary portion should be such that the angular momentum of material entering from the inlet is substantially conserved into the secondary portion.

*Split ratio=(flow through axial overflow outlet)/(flow through inlet).

Preferably, $d_3/d_2$ is less than 0.75 (more preferably less than 0.7) and preferably exceeds 0.25 (more preferably exceeding 0.3). Preferably where the internal length of the downstream tertiary portion is $l_3$, $l_3/d_3$ is at least 1, more preferably at least 5; it is typically about 10 and may be as large as desired, such as at least 40. For space reasons it may be desired to curve the dense-phase-outlet portion gently, and a radius of curvature of the order of $50d_3$ is possible, and gentle curvature of the cyclone axis is feasible. $d_1/d_2$ may be from $1\frac{1}{4}$ to 3. Preferably $d_o/d_2$ is at most 0.15 and preferably at least 0.008, possibly from 0.01 to 0.1, such as 0.02 to 0.06. Pressure drop in the axial overflow outlet should not be excessive, and therefore the length of the "$d_o$" portion of the axial overflow outlet should be kept low. The axial overflow outlet may reach its "$d_o$" diameter instantaneously or by any form of abrupt or smooth transition, and may widen thereafter by a taper or step. The axial distance from the inlet plane to the "$d_o$" point is preferably less than $4d_2$. The actual magnitude of $d_2$ is a matter of choice for operating and engineering convenience, and may for example be 10 to 100 mm.

In another version, according to the invention, at least part of the generator of the primary portion or of the separation portion or of both is curved. The generator may be, for example, (i) a monotonic curve (having no points of inflexion) steepest at the inlet-portion end and tending to a cone-angle of zero at its open end, or (ii) a curve with one or more points of inflexion but overall converging towards the downstream tertiary portion, preferably never diverging towards the downstream tertiary portion.

The invention extends to a method of removing a lighter phase from a larger volume of denser phase, comprising applying the phases to the feed of a cyclone separator as set forth above, the phases being at a higher pressure than in the axial overflow outlet and in the downstream end of the downstream tertiary portion; in practice, it will generally be found that the pressure out of the downstream outlet portion will exceed that out of the axial overflow outlet.

This method is particularly envisaged for removing up to 1 part by volume of oil (light phase) from over 19 parts of water (denser phase), (such as over 99 parts), such as oil-field production water or sea water which may have become contaminated with oil, as a result of spillage, shipwreck, oil-rig blow out or routine operations such as bilge-rinsing or oil-rig drilling. The ratio of flow rates upstream outlet/downstream outlet (and hence the split ratio) has a minimum value for successful separation of the oil, which value is determined by the geometry of the cyclone (especially by the value of $d_o/d_2$) but preferably the cyclone is operated above this minimum value, e.g., by back pressure for example provided by valving or flow restriction ouside the defined cyclone. Thus preferably the method comprises arranging the split ratio to exceed $1\frac{1}{2}(d_o/d_2)^2$, preferably to exceed $2(d_o/d_2)^2$.

The method may further comprise, as a preliminary step, eliminating free gas from the phases such that in the inlet material the volume of any gas is not more than 10%, such as not more than $\frac{1}{2}$%.

As liquids normally become less viscous when warm, water for example being approximately half as viscous at 50° C. as at 20° C., the method is advantageously performed at as high a temperature as convenient. The invention extends to the products of the method (such as concentrated oil, or cleaned water).

Figure 2:
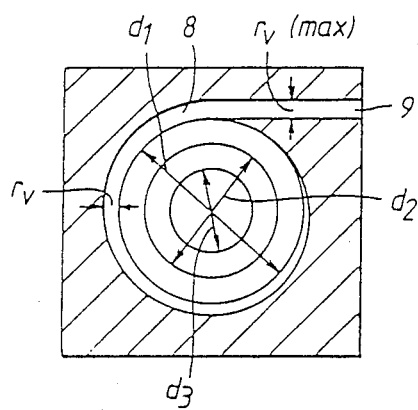

The invention will now be described by way of example with reference to the accompanying drawings, in which:

FIG. 1 shows, schematically, a cross-section taken on the axis of a cyclone separator according to the invention, and FIG. 2 is a view down the axis of the cyclone separator. The drawings are not to scale.

A primary portion 1 having generally the shape of a volume of revolution has a spiral feed channel 8 which in one form may be involute fed from a duct 9 directed tangentially into the widest part of the primary portion 1. The width (radially) of the duct 9 is $r_v$(max), and the channel 8 converges smoothly to the principal diameter $d_1$ of the inlet portion; thus $r_v$ diminishes linearly to zero at 360° after the point of entry of the duct 9 into the cyclone separator. This is best seen in FIG. 2, which is a view down the axis of the cyclone separator, whose end wall 11 has been removed. Coaxial with the primary portion 1, and adjacent to it, is a secondary portion 2, which opens at its far end into a coaxial generally cyclindrical downstream tertiary portion 3. The portion 3 opens into collection ducting 4. The channel 8 alternatively may be slightly angled towards the secondary portion 2 to impart an axial component of velocity, and in that case may be helical, reducing to the principal diameter $d_1$ after say 2 full revolutions.

The primary portion 1 has an axial overflow outlet 10 opposite the secondary portion 2.

In the present cyclone separator, the actual relationships are as follows:

$$d_1/d_2 = 1.5$$

The half-angle of conicity of the secondary portion $2 = 40'$ ($T_2$ on Figure).

The average half-angle of conicity of the primary portion $1 = 10°$ ($T_1$ on Figure).

Where the axial extent of the duct 9 is $l_i$, $l_i/d_i = \frac{1}{2}$ (more precisely 30/57).

$$l_3/d_3 = 40$$

$$d_o/d_2 = 0.04$$

This cyclone should accordingly be operated at a split ratio $$\frac{\text{flow rate through upstream outlet}}{\text{flow rate through inlet}}$$

of more than $1\frac{1}{2}(0.04)^2$, i.e. more than 0.24%.

To the principal diameter $d_1$ of the primary portion, there must be added a radial amount $r_v$ decreasing smoothly from $9\frac{1}{2}$ mm (maximum) to zero, for the volute inlet.

$$\frac{\pi d_2(d_1 + r_v(\max))}{4 l_i r_v(\max)} = 7,$$

noting that $l_i r_v(\max) = A_i$, as defined previously and $(d_1 + r_v(\max)) = d_1$ as defined previously, the foregoing expression thus being the swirl coefficient S of this cyclone. The taper which averages out as $T_1$ actually curves over a radiussing $R_1$ (radius = 5 mm) into a frustoconical part of the primary portion 1.

$d_2 = 38$ mm. This is regarded as the 'cyclone diameter' and for many purposes can be anywhere within the range 10–100 mm, for example 15–60 mm; with excessively large $d_2$, the energy consumption becomes large to maintain effective separation while with too small $d_2$ unfavourable Reynolds Number effects and excessive shear stresses arise.

The cyclone separator can be in any orientation with insignificant effect.

The wall 11 is smooth as, in general, irregularities upset the desired flow patterns, within the cyclone. For the best performance, all other internal surfaces of the cyclone should also be smooth. However, wall 11 need not be plane; it could be dished (convex or concave) or may have a small upstanding circular ridge concentric with the outlet 10 to assist the flow moving radially inward near the wall, and the outer 'fringe' of the vortex, to recirculate in a generally downstream direction for resorting. The outlet 10 is a cylindrical bore as shown, but its minimum diameter $d_o$ could instead be approached by a smooth curve of the wall 11, and the outlet 10 could thereafter diverge. Where the minimum diameter is provided by an orifice plate lying flush on the wall 11 and containing a central hole of diameter $d_o$ leading directly to a relatively large bore, the different flow characteristics appear to have a slightly detrimental, though not serious, effect on performance. The outlet 10 may advantageously be divergent in the direction of overflow, with the outlet widening thereafter at a cone half-angle of up to 10°. In this way, a smaller pressure drop is experienced along the outlet, which must be balanced against the tendency of the illustrated cylindrical bore (cone half angle of zero) to encourage coalescence of droplets of the lighter phase, according to the requirements of the user.

To separate oil from water (still by way of example), the oil/water mixture is introduced through the feed channel 8 at a rate of 70–110 l/min with any free gas in the inlet limited to $\frac{1}{2}$% by volume. The mixture is a dispersion of 0.15 parts by volume of Forties field crude oil in 99.85 parts of fresh water at 15.5° C. A convergence $T_1$ of average angle to the axis 10°, made up of a radiussed portion $R_1$ (radius = 5 mm) and a frusto-conical portion, brings the inlet portion down to the separation portion. Alternatively worded, 10° is the conicity (half-angle) of the notional average frustrum represented by $T_1$. The dispersion swirls into the second portion 2, conserving its angular momentum. The bulk of the oil separates to form an axial oil core within an axial vortex in the second portion 2.

The spiralling flow of the water plus remaining oil then enters the third portion 3. Some remaining oil separates within a continuation of the axial vortex in the third portion 3. The cleaned water leaves through the ducting 4 which may contain any necessary flow restriction and the cleaned water may be collected, for return to the sea for example or fur further cleaning, for example in a second similar or identical cyclone or a bank of cyclones in parallel.

Operating this cyclone at a split ratio of about 0.9% by the use of valves to control the flow out of the two outlets, oil entrained along the axis of the vortex moves axially to the overflow outlet and may be collected for dumping, storage or further separation, since it will still contain some water. In this case too, the further separation may include a second similar or identical cyclone.

Where the mean diameter of the oil droplets was 70 micrometers, $$\text{the efficiency} = 1 - \frac{\text{oil concentration in 4}}{\text{oil concentration in 8}}$$

rose with flowrate from 0.955 at 70 l/min to 0.966 at 110 l/min therefore suggesting no significant drop break-up that would be manifest as a more constant or falling efficiency. At 100 l/min efficiency was identical with a known twin-tangential inlet cyclone.

At a smaller drop-size mean diameter 50 micrometers and flowrate 100 l/min, an efficiency of 0.922 was obtained (0.924 in the known cyclone). Other performance characteristics such as the volumetric flowrate through the overflow 10 as a proportion of that through the ducting 4, or the pressure drop between 8 and 4, were broadly similar to the known cyclone, i.e., that described in UK Specification No. 2102311.

The single duct 9, apart from its advantages in instalation and manufacture and space-saving, is more amenable to flow control than a multiple inlet; a simple movable plate or plug or gate adjustable within the duct can be provided to control the inlet flow and, by varying the effective cross-sectional area of the inlet, to control the swirl coefficient S.

What is claimed is:

1. A cyclone separator for the separation of a mixture including multiphase liquids, the separator comprising a primary portion having generally the form of a volume of revolution and having a first end and a second end, the diameter $d_2$ at said second end being less than the diameter $d_1$ at said first end, a single inlet with at least a tangential component at said first end of said primary portion for introducing the mutiphase mixture to be separated into the cyclone separator and at least two outlets; characterized in that the following relationship applied: where $d_1$ is the diameter of the cyclone in the inlet portion where flow enters (but neglecting any feed channel), $d_i$ is twice the radius at which flow enters the cyclone (i.e. twice the minimum distance of the tangential component of the inlet center line from the axis), $d_o$ is the diameter of said overflow outlet, $A_i$ is the cross-sectional area of the inlet at entry to the cyclone in a plane parallel to the axis of the cyclone and perpendicular to the component of the inlet center line not parallel to the cyclone axis, $d_2$ is the diameter of the primary portion at said second end and is measured at a point $z_2$ where the condition first applies that:

$$\tan^{-1}\left(\frac{d_2 - d}{2(z - z_2)}\right) < 2°$$

for all z greater than $z_2$ where z is the distance along the cyclone separator axis downstream of the plane containing the inlet and d is the diameter of the cyclone at z, then $$\pi \frac{d_2 \times d_i}{4 A_i}$$

is from 3 to 12.

2. A cyclone separator according to claim 1 wherein $$\frac{\pi d_2 d_i}{4 A_i}$$

is from 4 to 10.

3. A cyclone separator according to claim 2 wherein $$\frac{\pi d_2 d_i}{4 A_i}$$

is from 6 to 8.

4. A cyclone separator according to claim 1, further including a generally axially symmetrical secondary portion at said second end and substantially coaxial with said primary portion and wherein $d/d_3 > 0.98$ for all $z > z_3$, where $d_3$ is the diameter of the end of the secondary portion remote from said primary portion.

5. A cyclone separator according to claim 4 further including a tertiary portion substantially coaxial with said secondary portion and at the end of said secondary portion remote from said primary portion.

6. A cyclone separator according to claim 4 wherein $20' < \alpha < 2°$ where $\alpha$ is the half angle of convergence of the secondary portion; i.e.

$$\alpha = \tan^{-1} \frac{d_2 - d_3}{2(z_3 - z_2)}.$$

7. A cyclone separator according to claim 6 wherein $\alpha$ is from 30' to 52'.

8. A cyclone separator according to claim 4 wherein $d_2 < 0.9 d_i$.

9. A cyclone separator according to claim 8 wherein $d_3 < 0.9 d_2$.

10. A cyclone separator according to claim 9 wherein $d_3/d_2$ is from 0.25 to 0.75.

11. A cyclone separator according to claim 4 wherein $d_3 < 0.9 d_2$.

12. A cyclone separator according to claim 4 wherein the secondary portion is a volume of revolution, the generator of which is a continuously curved line.

13. A cyclone separator according to claim 1 wherein $d_2 < 0.9 d_i$.

14. A cyclone separator according to claim 1 wherein the inlet gives into an inwardly spiralling feed channel.

15. A cyclone separator according to claim 1 wherein the inlet enters the cyclone with a component in the axial downstream direction.

16. A cyclone separator according to claim 1 wherein one of said outlets is an overflow outlet at said first end of first said primary portion.

17. A cyclone separator according to claim 16 wherein $d_o/d_2 < 0.2$ where $d_o$ is the diameter of said one of said outlets.

18. A cyclone separator according to claim 17 wherein $d_o/d_2$ is from 0.008 to 0.1.

19. A cyclone separator according to claim 1 wherein the primary portion is a volume of revolution, the generator of which is not a straight line.

20. A method of removing a lighter phase from a larger volume of a denser phase, comprising providing a cyclone separator having at least a primary portion having generally the form of a volume of a revolution and having a first end and a second end, the diameter at said second end being less than the diameter at said first end, a single inlet with at least a tangential component at or adjacent said first end for introducing feed to be separated into the cyclone separator and the separator further including at least two outlets, applying the phases to the feed of said cyclone separator, and withdrawing a product at each of said outlets, in which cyclone separator the following relationship applies; where $d_1$ is the diameter of the cyclone in the inlet portion where flow enters (but neglecting any feed channel), $d_i$ is twice the radius at which flow enters the cyclone (i.e. twice the minimum distance of the tangential component of the inlet center line from the axis), $A_i$ is the cross-sectional area of the inlet at entry to the cyclone in a plane parallel to the axis of the cyclone and perpendicular to the component of the inlet center line not parallel to the cyclone axis, $d_2$ is the diameter of the primary portion at said second end and is measured at a point $z_2$ where the condition first applies that:

$$\tan^{-1}\left(\frac{d_2 - d}{2(z - z_2)}\right) < 2°$$

for all z greater than $z_2$ where z is the distance along the cyclone separator axis downstream of the plane containing the inlet and d is the diameter of the cyclone at z, then $$\pi \frac{d_2 \times d_i}{4 A_i}$$

is from 3 to 12.

21. A cyclone separator for the separation of a mixture including multiphase liquids, the separator comprising a primary portion having generally the form of a volume of revolution and having a first end and a second end, the diameter $d_2$ at said second end being less that the diameter $d_1$ at said first end, a generally axially symmetrical secondary portion at said second end and substantially co-axial with said primary portion, said secondary portion having a diameter $d_3$ at the end thereof remote from said primary portion, a single involute inlet, with at least a tangential component at said first end of said primary portion for introducing the multiphase mixture to be separated into the cyclone separator, an overflow outlet at said first end of said primary portion and an underflow outlet at the end of the cyclone separator or remote from said first end; characterized in that the following relationship applies: where $d_1$ is the diameter of the cyclone in the inlet portion where flow enters (but neglecting any feed channel), $d_i$ is twice the radius at which flow enters the cyclone (i.e. twice the minimum distance of the tangential component of the inlet center line from the axis), $d_o$ is the diameter of said overflow outlet, $A_i$ is the cross-sectional area of the inlet at entry to the cyclone in a plane parallel to the axis of the cyclone and perpendicular to the component of the inlet center line not parallel to the cyclone axis, $d_2$ is the diameter of the primary portion at said second end and is measured at a point $z_2$ where the condition first applies that:

$$\tan^{-1}\left(\frac{d_2 - d}{2(z - z_2)}\right) < 2°$$

for all z greater than $z_2$ where z is the distance along the cyclone separator axis downmstream of the plane containing the inlet and d is the diameter of the cyclone at z, then $$\frac{\pi d_2 \times d_i}{4 A_i} \text{ is from 3 to 12}$$

$$\frac{d_o}{d_2} < 0.2$$

and wherein $$20' < \alpha < 2°$$

where $\alpha$ is the half angle of convergence of the secondary portion.

* * * * *

UNITED STATES PATENT AND TRADEMARK OFFICE
CERTIFICATE OF CORRECTION

PATENT NO. :   4,764,287
DATED      :   August 16, 1988
INVENTOR(S) :  Derek A. Colman, et al It is certified that error appears in the above-identified patent and that said Letters Patent is hereby corrected as shown below:

Front Page, left-hand column, under the heading

"[30] Foreign Application Priority Data, after

"Aug. 2, 1984 [GB] United Kingdom.......8419771", please add the inventor's second claim to priority as follows:

---May 2, 1985 [GB] United Kingdom......8511149---.

Signed and Sealed this

Sixteenth Day of May, 1989

*Attest:*

DONALD J. QUIGG

*Attesting Officer*     *Commissioner of Patents and Trademarks*